United States Patent
Brun et al.

(10) Patent No.: US 8,374,844 B2
(45) Date of Patent: Feb. 12, 2013

(54) HYBRID SYSTEM FOR NAMED ENTITY RESOLUTION

(75) Inventors: Caroline Brun, Grenoble (FR); Maud Ehrmann, Grenoble (FR); Guillaume Jacquet, Biviers (FR)

(73) Assignee: Xerox Corporation, Norwalk, CT (US)

( * ) Notice: Subject to any disclaimer, the term of this patent is extended or adjusted under 35 U.S.C. 154(b) by 1537 days.

(21) Appl. No.: 11/846,740

(22) Filed: Aug. 29, 2007

(65) Prior Publication Data

US 2008/0319978 A1 Dec. 25, 2008

Related U.S. Application Data

(60) Provisional application No. 60/945,673, filed on Jun. 22, 2007.

(51) Int. Cl.
- G06F 17/27 (2006.01)
- G06F 17/20 (2006.01)
- G06F 17/28 (2006.01)
- G06F 17/21 (2006.01)
- G10L 15/00 (2006.01)
- G10L 11/00 (2006.01)

(52) U.S. Cl. ............ 704/9; 704/1; 704/4; 704/5; 704/8; 704/10; 704/240; 704/257; 704/270

(58) Field of Classification Search ............... 704/1–10, 704/240, 257, 270; 707/736
See application file for complete search history.

(56) References Cited

U.S. PATENT DOCUMENTS

| | | | |
|---|---|---|---|
| 6,115,683 A * | 9/2000 | Burstein et al. | 704/1 |
| 6,173,261 B1 * | 1/2001 | Arai et al. | 704/257 |
| 6,311,152 B1 | 10/2001 | Bai et al. | |
| 6,408,266 B1 * | 6/2002 | Oon | 704/1 |
| 6,697,793 B2 * | 2/2004 | McGreevy | 1/1 |
| 6,842,730 B1 * | 1/2005 | Ejerhed et al. | 704/9 |
| 6,975,766 B2 | 12/2005 | Fukushima | |
| 7,058,567 B2 | 6/2006 | Aït-Mokhtar et al. | |
| 7,171,350 B2 | 1/2007 | Lin et al. | |
| 2003/0083859 A1 * | 5/2003 | Murata | 704/1 |
| 2003/0177000 A1 * | 9/2003 | Mao et al. | 704/9 |
| 2003/0208354 A1 * | 11/2003 | Lin et al. | 704/9 |
| 2005/0131886 A1 * | 6/2005 | Ejerhed et al. | 707/3 |
| 2006/0047690 A1 * | 3/2006 | Humphreys et al. | 707/102 |
| 2006/0277465 A1 | 12/2006 | Pandit et al. | |
| 2007/0078644 A1 * | 4/2007 | Huang et al. | 704/9 |
| 2007/0179776 A1 * | 8/2007 | Segond et al. | 704/9 |
| 2007/0198600 A1 * | 8/2007 | Betz | 707/201 |
| 2007/0219773 A1 * | 9/2007 | Roux et al. | 704/1 |
| 2008/0294425 A1 * | 11/2008 | Hull et al. | 704/9 |
| 2008/0300856 A1 * | 12/2008 | Kirk et al. | 704/4 |
| 2009/0100053 A1 * | 4/2009 | Boschee et al. | 707/6 |
| 2010/0114561 A1 * | 5/2010 | Yasin | 704/9 |

(Continued)

OTHER PUBLICATIONS

Nadeau. "Semi-Supervised Named Entity Recognition: Learning to Recognize 100 Entity Types with Little Supervision" 2007.*

(Continued)

Primary Examiner — Edgar Guerra-Erazo
(74) Attorney, Agent, or Firm — Fay Sharpe LLP (57) ABSTRACT

A method for named entity resolution includes parsing an input text string to identify a context in which an identified named entity of the input text string is used. The identified context is compared with at least one stored context in which the named entity in the stored context is associated with a class of named entity, the named entity class being selected from a plurality of classes, at least one of the plurality of classes corresponding to a metonymic use of a respective named entity. A named entity class is assigned to the identified named entity from the plurality of named entity classes, based on at least one of the identified context and the comparison.

21 Claims, 4 Drawing Sheets

U.S. PATENT DOCUMENTS

2010/0169299 A1* 7/2010 Pollara .................. 707/708

OTHER PUBLICATIONS

K.Markert, M.Nissim, *Metonymy Resolution as a Classification Task*, Proc. Conf. on Empirical Methods in Natural Language Processing(EMNLP 2002), Philadelphia, USA (2002).

M.Nissim, K.Markert, *Syntactic Features and Word Similarity for Supervised Metonymy Resolution*, Proc. 41st Annual Meeting of the Association of Computational Linguistics (ACL-03), Sapporo, Japan (2003).

M.Nissim, K.Markert, *Learning to Buy a Renault and to Talk to a BMW: A Supervised Approach to Conventional Metonymy*, Proc. 6th Int'l Workshop on Computational Semantics, Tilburg (2005).

Y.Peirsman, *What's in a Name? Computational Approaches to Metonymical Location Names*, Proc. Workshop on Making Sense of Sense: Bringing Psycholinguistics and Computational Linguistics Together, Trento, Italy (2006).

T.Poibeau, *Dealing with Metonymic Readings of Named Entities*, Proc. 28th Annual Conf. of the Cognitive Science Society (COGSCI 2006), Vancouver (2006).

U.S. Appl. No. 60/945,673, filed Jun. 22, 2007, Brun, et al.

S.Aït-Mokhtar, J.P.Chanod, C.Roux, *Robustness Beyond Shallowness: Incremental Dependency Parsing*, Special Issue of NLE Journal, (2002).

S.Aït-Mokhtar, J.P.Chando, *Incremental Finite-State Parsing*, Proc. of Applied Natural Language Processing, Washington, Apr. 1997.

S.Aït-Mokhtar, J.P.Chando, *Subject and Object Dependency Extraction Using Finite-State Transducers*, Proc. ACL'97 Workshop on Information Extraction and the Building of Lexical Semantic Resources for NLP Applications, Madrid, Spain, Jul. 1997.

S.Abney, *Parsing by Chunks*, Principle-based Parsing, (Robert Berwick, Steven Abney and Carol Teny, Eds., Kluwer Academics Publishers) 1991.

C.Hagège, C.Roux, *Entre Syntaxe et Sémantique: Normalisation de la sortie de l'analyse syntaxique en vue de l'amélioration de l'extraction d'information à partir de textes*, Proc. TALN 2003, Batz-sur-Mer, France, Jun. 11-14, 2003.

C.Brun, C.Hagège, *Normalization and Paraphrasing Using Symbolic Methods*, Proc. 2nd Int'l Workshop on Paraphrasing, ACL'03, Sapporo, Japan, (2003).

K.Markert, M.Nissim, *Towards a Corpus Annotated for Metonymies: the Case of Location Names*, Proc. 3rd Int'l Conf. on Language Resource and Evaluation, (LREC 2002), Las Palmas, Spain, (2002).

K.Markert, M.Nissim, *Metonymic Proper Names: A Corpus-Based Account*, Stefanowitsch A. and Gries S., Eds., Corpus-Based Approaches to Metaphor and Metonymy, Mouton de Gruyter, (2002).

Ace Phase 2 Program Committee, *Entity Detection and Tracking—Phase 1*, EDT and Metonymy Annotation Guidelines, Version 2.5.1 20030502, 2003.

C.Brun, M.Ehrmann, G.Jacquet, *A Hybrid System for Named Entity Metonymy Resolution*, ACL-SemEval 2007, 4th Int'l Workshop on Semantic Evaluations, Prague, Jun. 23-24, 2007.

J.Ruppenhofer, M.Ellsworth, M.R.L.Petruck, C.R.Johnson, J.Scheffczyk, *Framenet II: Extended Theory and Practice*, ICSI Technical Report, (2006).

K.Markert, M.Nissim, *Metonymy Resolution at SemEval I: Guidelines to Participants*, Feb. 25, 2007.

G.Jacquet, F.Venant, *Construction Automatique de Classes de Sélection Distributionelle*, In Proc. TALN, Dourdan, 2005.

A.Kilgarriff, P.Rychly, P.Smrz, D.Tugwell, *The Sketch Engine*, In Proc. Euralex, pp. 105-116, 2004.

D.Lin, *Automatic Retrieval and Clustering of Similar Words*, In COLING-ACL, pp. 768-774, 1998.

D.Maynard, K.Bontcheva, H.Cunningham, *Towards a Semantic Extraction of Named Entities*, In Proc. of RANLP, 2003.

S.Strassel, A.Mitchell, S.Huang, *Multilingual Resources for Entity Extraction*, In Proc. of the ACL 2003 Workshop on Multilingual and Mixed-Language Name Entity Recognition, 2003.

G.Doddington, A.Mitchell, M.Przybocki, L.Ramshaw, S. Strassel, R. Weischedel, *The Automatic Content Extraction (ACE) Program Tasks, Data, and Evaluation*, In Proc. of LREC 2004, pp. 837-840, 2004.

C.Brun, C.Hagège, *Intertwining Deep Syntactic Processing and Named Entity Detection*, ESTAL 2004, Alicante, Spain, Oct. 20-22, 2004.

G.A.Marton, *Sepia: Semantic Parsing for Named Entities*, Massachusetts Institute of Technology, Aug. 2003.

* cited by examiner

HYBRID SYSTEM FOR NAMED ENTITY RESOLUTION

This application claims the priority benefit of U.S. Provisional Application Ser. No. 60/945,673, filed Jun. 22, 2007, the disclosure of which is incorporated herein by reference in its entirety.

BACKGROUND

The exemplary embodiment relates to a system and method for named entity resolution. It finds particular application in the identification of metonymy for applications such as information extraction in general, question answering, machine translation, and anaphora resolution.

Metonymy is a form of figurative speech, in which one expression is used to refer to the standard referent of a related expression. For example, named entities, such as the names of persons, organizations, and locations, have a literal meaning and are frequently used in that sense. Beyond their literal meaning, however, named entities are also frequently subject to metonymy. Named entities can thus refer to other concepts than the standard referent, as shown on the following examples of metonymy:

(1) At the time of Vietnam, increased spending led to inflation.

(2) The BMW slowed down.

In Example (1), Vietnam, the name of a location, is used to refer to an event, i.e., the war that happened there. In (2), the name of the company BMW stands for a vehicle manufactured by the company and therefore refers to an object.

In information extraction, it is particularly useful to detect such metonymies on named entities, to be able to detect the proper nature of concepts expressed in a document. Consequently, detection of metonymy is also very useful in tasks such as machine translation, question answering and anaphora resolution.

There remains a need for a natural language processing system capable of detecting metonymy in a wide variety of contexts.

BRIEF DESCRIPTION

In accordance with one aspect of the exemplary embodiment, a method for named entity resolution includes parsing an input text string to identify a context in which an identified named entity of the input text string is used. The identified context is compared with at least one stored context in which the named entity in the stored context is associated with a class of named entity, the named entity class being selected from a plurality of classes, at least one of the plurality of classes corresponding to a metonymic use of a respective named entity. A named entity class is assigned to the identified named entity from the plurality of named entity classes, based on at least one of the identified context and the comparison.

In accordance with another aspect of the exemplary embodiment, a hybrid system for named entity resolution includes a symbolic component for identifying a context in which an identified named entity of an input test string is used and a distribution component for computing a distance between the identified context in which the named entity is being used and another context in which the named entity is used in a known metonymic sense. A data structure stores a plurality of contexts. The system assigns a class to the identified named entity, based on at least one of the identified context and the computed distance.

In accordance with another aspect, a method for document annotation includes inputting a document comprising at least one text string, parsing the text string to identify a context in which an identified named entity of the text string is used, comparing the identified context with at least one stored context in which the named entity in the stored context is associated with a class of named entity, the named entity class being selected from a plurality of classes, at least one of the plurality of classes corresponding to a metonymic use of a respective named entity, assigning a named entity class from the plurality of named entity classes to the identified named entity based on at least one of the identified context and the comparison, and annotating the document based on the assigned class.

REFERENCES

The following references are incorporated herein by reference in their entireties:

There are several patents which deal with Named Entity recognition in general, but which do not address Named Entity Metonymy Resolution, including U.S. Pat. Nos. 7,171,350; 6,975,766, and 6,311,152.

U.S. Pat. No. 7,058,567, entitled NATURAL LANGUAGE PARSER, by Aït-Mokhtar, et al. discloses a finite state parser which may be utilized in natural language processing.

U.S. Pub. No. 20070179776, by Segond, et al., discloses a system for retrieval of text which includes a processor which identifies grammar rules associated with text fragments of a text string that is retrieved from an associated storage medium, and retrieves text strings from the storage medium which satisfy the grammar rules. A user input device in communication with the processor enables a user to select text fragments of displayed text strings for generating a query. The processor identifies grammar rules associated with the user-selected text fragments and retrieves text strings from the storage medium which satisfy the grammar rules.

U.S. Pub. No. 20060277465 by Pandit, et al. discloses a method for analyzing and deriving analytical insights from textual information. The structure in which the text information is rendered is determined. A cyclical extraction process using the parameters of co-frequency, co-dependency, and co-relatedness and parts of speech, determines various textual aspects and their subcomponents such as themes and dimensions. Using the subcomponents of the textual aspects, relation maps are built, disambiguated and ranked. A multidimensional navigation matrix is created that helps a user navigate across dimensions.

The following publications redefine metonymy resolution of proper names as a classification task similar to word sense disambiguation, with the difference that the objects of disambiguation are semantic classes and not yet individual words: Markert, K. and Nissim, M., "Metonymy Resolution as a Classification Task," Proc. Conf. on Empirical Methods in Natural Language Processing (EMNLP 2002), Philadelphia, USA (2002); Nissim, M and Markert, K., "Syntactic Features and Word Similarity for Supervised Metonymy Resolution, in Proc. 41st Annual Meeting of the Association of Computational Linguistics (ACL-03), Sapporo, Japan (2003); and Nissim, M and Markert, K., "Learning to Buy a Renault and to talk to a BMW: A Supervised Approach to Conventional Metonymy.," in Proc. 6th Int'l. Workshop on Computational Semantics, Tilburg (2005).

Peirsman, Y., "What's in a name? Computational Approaches to Metonymical Location Names," in Proc. Workshop on Making Sense of Sense: Bringing Psycholinguistics and Computational Linguistics Together, Trento, Italy (2006) discloses comparative experiments for location names with supervised algorithms (based on Schütze's approach) and non-supervised ones (memory-based learning), investigating the relevance of various features. These algorithms use context windows and are purely statistical.

Poibeau, T., "Dealing with Metonymic Readings of Named Entities," in Proc. 28th Annual Conf. of the Cognitive Science Society (COGSCI 2006), Vancouver (2006) sets out to resolve metonymic readings of French named entities using probability levels that compute the discriminative power of various features. He uses the same approach as the one proposed in the Markert and Nissim references, but generalizes it to a larger set of named entity classes.

DETAILED DESCRIPTION

Aspects of the exemplary embodiment disclosed herein relate to an apparatus and method for metonymic extraction based on a combination of symbolic and distributional statistical methods that uses the syntactico-semantic context of the named entity as well as lexical semantic information, in order to detect and semantically interpret instances of named entity metonymy.

As used herein, a named entity can be a location (such as a country, state, town, geographic region, or the like) or organization (such as a corporation, institution, association, government or private organization, or the like), or other proper name which is typically capitalized in use to distinguish the named entity from an ordinary noun.

Metonymy, as used herein, generally refers to the use of a named entity to refer to a related expression. A metonymic use is the use of a named entity as metonymy rather than its literal use. In the exemplary embodiment, named entity metonymy resolution is described for location names and organization names, although it is to be appreciated that the system is applicable to other named entities used in a metonymic sense, such as person names, and temporal entities, as in:

I took Martin Luther King to the freeway
Here, Martin Luther King refers to a road
After Sep. 11, 2001, New York was . . . .

In order to perform named entity metonymy resolution on location names and organization names, a hybrid system, based on the use of a robust parser that extracts deep syntactic relations combined with a non supervised distributional approach, also relying on the relations extracted by the parser, is applied.

Aspects of the exemplary embodiment relate to an apparatus for named entity resolution. The apparatus receives input text and is configured for identifying a named entity in the text. The apparatus may assign a tag to the named entity based on a determination of whether the named entity is used in a literal sense or metonymic sense. If metonymic, the apparatus may also assign a class of metonymy. The exemplary apparatus may be hosted by a computing device, such as a general purpose computer or dedicated computing device with processing capability and memory storage. The apparatus includes processing modules including a parser and a distributional component. The modules can be in the form of software, hardware, or both. The parser performs named entity extraction as well as determining a context in which the named entity is used, based on syntactical relations between named entities and other lexical units (single words or longer text fragments) of a text string, such as a sentence. The parser also applies rules which denote some of the contexts as indicative of a metonymic use. The distributional component computes a distance between a first context in which a named entity is used and a second context in which the named entity is used in a known metonymic sense and, based on the distance, determines whether the first context is indicative of a metonymic use. The distributional component enables the prediction of metonymic uses of named entities in situations where the parser does not have a specific rule for the particular context in which the named entity is used.

In other aspects a method of use of such an apparatus and a method of forming the apparatus are described.

The Metonymy Resolution Task

Metonymic phenomenon apply in a regular way, therefore, given a semantic class (e.g. location), several regular metonymic shifts (e.g. place-for-event) can be specified that instances of the class are likely to undergo. If a metonymic reading is selected, a further specification into one of a set of pre-specified metonymic patterns (such as place-for-event or company-for-stock) or, alternatively, recognition as an innovative reading, can be assigned. By way of example, the following general classes can be designated. The named entities in question are highlighted in bold in the examples of each class. The examples are taken from Markert, K. and Nissim, M. *Metonymy Resolution at SemEval I*. Guidelines for participants (2007).

A. For Locations:
   (1) Literal: the use of the named entity has a purely locative
      (a) or political interpretation (b):
         a. Coral Coast of Papua New Guinea.
         b. Britain's current account deficit.
   (2) Metonymic:
      a. Place-for-people: a place stands for any persons/organization associated with it, as in:
         England won the semi-final.
         Here England refers to England's soccer team, not to the country.
      b. Place-for-event: the location name stands for an event that happened there, as in:
         Vietnam haunted him.
         Here Vietnam refers to the Vietnam war, not the place.
      c. Place-for-product: the location name stands for the product developed there, as in:
         A smooth Bordeaux that was gutsy enough.
      d. Object-for-name: the location name is used as a mere reference to a name, as in:
         Guyana (formerly British Guyana)
      e. Object-for-representation: the name refers to a representation (a photo, picture, etc.), as in:
         This is Malta.
      f. Othermet: for all other classes of metonymic reading not covered elsewhere (innovative reading), such as:
         The end is very New York/New Jersey and the start is very melodic.

(3) Mixed: when the context triggers different readings for a given occurrence, at least one of which is metonymic, such as:
They arrived in Nigeria, hitherto a leading critic of [ . . . ].
Here, Nigeria is used first in a literal sense, and subsequently as place-for-people).

B. For Organizations:
(1) Literal: referring to the organization as a legal entity in general:
a. NATO countries.
b. Sun acquired that part of Eastman Co's subsidiary.
(2) Metonymic:
a. Organization-for-members: an organization stands for its members, as in:
Last February, IBM announced . . . .
b. Organization-for-event: the organization name refers to an event associated with the organization, as in:
[ . . . ] in the aftermath of Westland.
c. Organization-for-product: the organization name refers to its products, as in:
A red light was hung on the Ford's tail gate.
d. Organization-for-facility: the organization name stands for the facility that houses the organization, as in:
The opening of a MacDonald's is a major event
e. Organization-for-index: the name is used as a (stock) index indicating its value, as in:
BMW slipped 4 cents to $3.99.
f. Object-for-name: the name is used as a string, as in:
Chevrolet is feminine . . . .
g. Object-for-representation: the name refers to a representation, for example a logo:
Graphically, it lacked what kings call the word class of Shell.
h. Othermet: for all other types of metonymy not otherwise covered (innovative reading), such as:
Funds had been paid into National Bank.
(3) Mixed: when the context triggers different readings, at least one of which is metonymic, for a given occurrence, as in:
National slipped 4 c to $3.51 after confirming 3,000 job losses.
(both org-for-index & org-for-members)

When a metonymic use is identified in a text string, the lexical unit identified as a named entity may be annotated with a label corresponding to an appropriate one of a plurality of location-specific or organization-specific metonymic classes of the type outlined above. Literal readings may be left unlabeled or annotated with a "literal" class.

It may be noted that while literal readings generally constitute the bulk of named entities in a given corpus (set of documents), some of the classes of metonymic use are quite common, such as organization-for-members and place-for-people. Accordingly it is desirable to detect these instances of metonymic use. A description of an exemplary system and method for resolution of metonymy on named entities now follow.

Metonymic Extraction System

Figure 1:
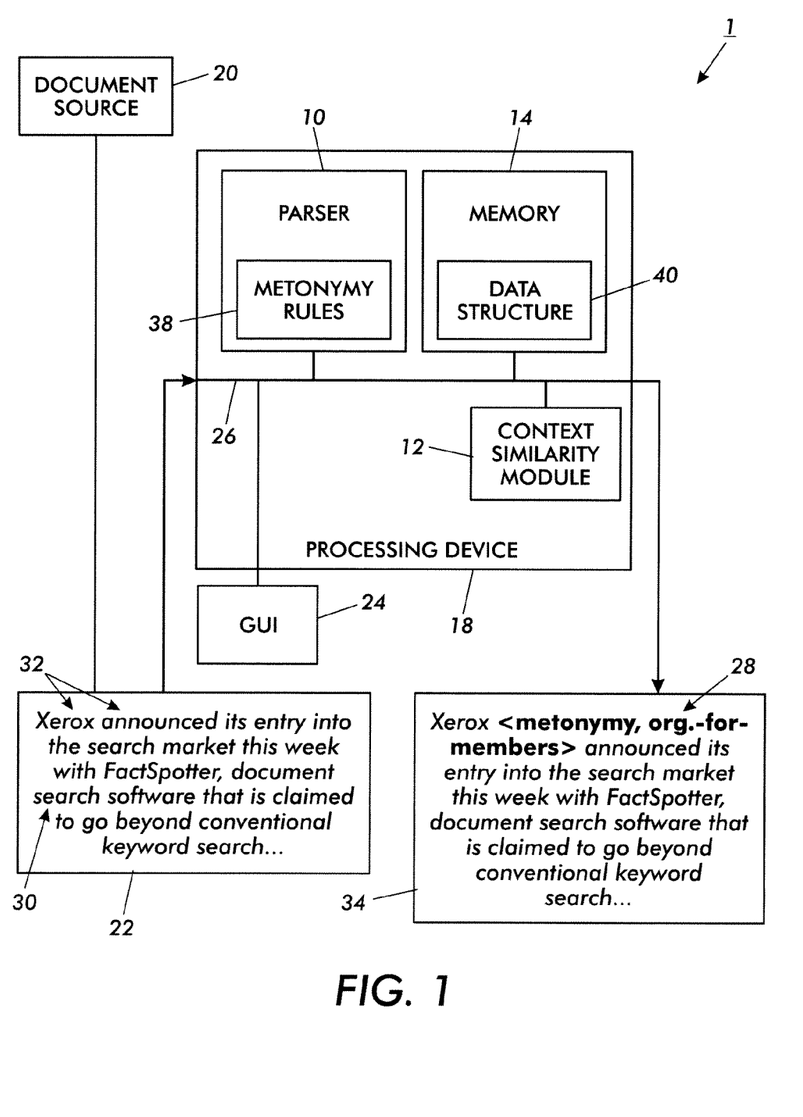
FIG. 1 is a functional block diagram of an exemplary natural language processing system which performs metonymic extraction in accordance with one aspect of the exemplary embodiment.

With reference to FIG. 1, a hybrid system 1 for metonymy resolution/metonymic extraction includes a symbolic component comprising a natural language parser 10 which identifies a context in which an identified named entity is used in an input text string, a distributional component 12 which computes a most likely named entity class for the named entity, based on the identified context and the classes assigned to a set of stored contexts, and a memory 14, interconnected by a data/control bus 16. The system may be hosted by a processing device 18, such as a general purpose computer, e.g., a desktop PC, a laptop PC, a workstation, a server, or a mainframe computer, or a dedicated computing device, on which the parser 10 and distributional component 12 are loaded as software. In general, the processing device 18 can be any device which is capable of performing the steps of the document annotation method outlined in FIG. 2. While the exemplary system is illustrated as being physically located on a single processing device, it is to be appreciated that components or subcomponents of the system may be remote from one another, e.g., on a client and server.

A document source 20 is arranged to provide a document 22, which is to be processed by the system 1, to the computing device 18. Source 20 may be a general purpose computer, e.g., a desktop computer, laptop, or the like, a dedicated computing device, a memory storage device, a server, a scanner, a facsimile machine, or any other device capable of providing a document for processing.

The device 18 may communicate with a user interface 24, here illustrated as a graphical user interface (GUI) which allows a user to interact with the system, view annotated text, conduct information extraction searches, or the like. An exemplary user interface is described, for example, in above-mentioned U.S. Pub. No. 20070179776, incorporated by reference. Components of the system may be connected by a data/control bus 26.

The parser 10 converts input text to a sequence of tokens and performs named entity extraction (e.g., by accessing a lexical source) thereon to identify named entities in the input text. The parser also identifies syntactic relations between the identified named entities and other words/phrases in the text, generally on a sentence basis. The parser also applies a set of rules designed to identify metonymic readings of named entities. The natural language parser 10 annotates the document 22, for example by tagging the document with applicable grammar rules, and when one or more of the metonymy rules triggers a metonymic reading, applies an appropriate metonymy tag 28 to the document.

The document 22 to be input to the device 18 may be stored on disk or other portable storage medium or may be sent to the device 18 via a link, such as the Internet or a wireless or wired network. The document 22 can be in text format or in an extensible markup language (XML). Alternatively, the documents may be hard copies and the device 18 may include or be associated with a scanner (not shown) for scanning the hard copies of documents and include appropriate OCR software for converting the scanned document to characters.

A "document," as used herein generally refers to a body of text and may be a subpart of a larger document which may also include other information, such as drawings, photographs, and the like. In general, each document 22 comprises one or more text strings 30 expressed in a natural language having a vocabulary and a grammar. Each text string can be as short as a phrase or clause of a sentence and generally comprises a sentence and may comprise two or more contiguous sentences. An input document generally includes a plurality of text strings each comprising a plurality of text fragments 32, such as words, phrases, numbers, and dates, or combinations thereof. In the case of input XML documents, the searchable text strings may include hidden text. The computer system 1 transforms the input text into a body of annotated, searchable text, here illustrated as an annotated document 34. In particular the output text 34 is annotated with tags 28, such as HML tags, metadata, or direct annotations, identifying metonymic uses of named entities. As will be appreciated, a variety of other annotations may also be applied to the document. The input documents 18 may be stored prior to or during processing in the memory 14.

The memory 14 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like. In one embodiment, the memory 14 and processing components 10, 12 are combined in a single chip. The exemplary memory 14 stores instructions executed by the parser 10 and distributional component 12 as well as the original document 22, annotated document 34, annotations generated during the processing, and optionally stores a database of such annotated documents 22.

The parser 10 takes as input one or more documents 22 in electronic form, each document including at least one text string 30, and transforms the input document(s) into annotated document(s). As used herein, the term "parser," generally refers to all of the annotation processing instructions which may be utilized in the annotation of the text string 30. The annotation preserves the inner grammatical structure of the text string, allowing for a fast search. In general, the parser 10 includes instructions for syntactically, semantically, and lexically analyzing the text content of the documents and identifying syntactic relationships between lexical units (words or groups of words) in the documents.

Annotated documents may be stored in a database, such as a relational database, where they can be queried with SQL language queries, or as an enriched XML file. The database can be located in any suitable storage medium, such as a disk, hard drive, Internet server, or the like. Along with XML, other structured formats that include structuring schema or other explicit organization can be used to provide a common structured document format for the annotated documents.

The exemplary parser 10 applies a set of rules for assigning tags to text. In addition to tags which identify syntactic relations between words (including phrases) of a sentence, the parser also applies a set of rules for determining whether a named entity which has been identified in the text is used in a context (e.g., is in a syntactic relation with another word) which is indicative of a metonymic, rather than a literal usage of the named entity.

For those named entities which cannot be classified as literal or metonymic by the existing parser rules, the context similarity model 12, which has been trained on a large untagged corpus of text, computes a distance between the context in which the named entity is currently being used and one or more other contexts in which it has been previously determined whether or not the named entity is a metonymy. Based on the distance, the distributional component 12 assigns a metonymic or literal usage to the named entity. If metonymic, the named entity may be assigned to a metonymic class which is the same as that assigned to the known context. Further details of the parser and contact similarity module are best understood in the context of the exemplary method of metonymy resolution, which will now be described.

Figure 2:
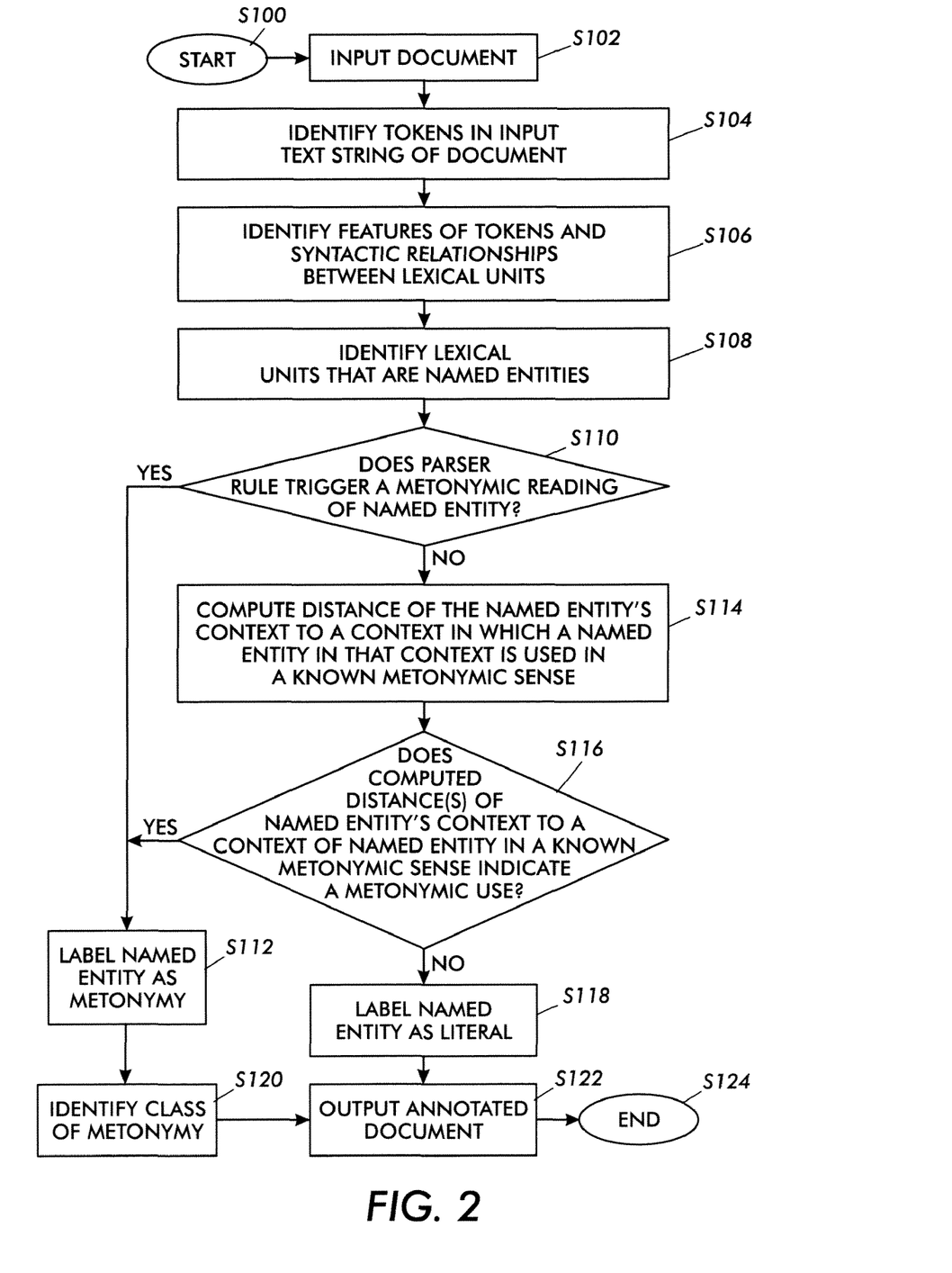
FIG. 2 is a flow chart which illustrates a method for metonymic extraction in accordance with another aspect of the exemplary embodiment.

With reference to FIG. 2, an exemplary method for metonymy resolution is illustrated. The method can include fewer, more, or different steps to those shown and need not proceed exactly in the order specified. The method begins at S100. The method assumes the generation of a corpus of At S102, a document to be processed is input in a suitable format for processing. If the document is not in a form in which it can be processed by the system 1, it may be converted to a suitable form, e.g., by OCR processing of a scanned document.

At S104, a selected text string is parsed to identify a sequence of tokens, each token in a string of tokens including a text fragment, such as a word.

At S106 the parser processes the text fragments to identify syntactic relations between text fragments.

At S108, which may be performed before, during, or after S106, text fragments corresponding to named entities may be identified by the parser and labeled as such. Methods for named entity extraction may be performed in a variety of ways, such as through accessing an on-line or off-line resource, such as Wikipedia or other knowledge base. In particular, through access to one or more knowledge bases, the parser identifies named entities corresponding to location and organization names.

If at S108, a named entity (in particular, a location or organization named entity) is found in the input text string, at S110, the parser applies rules to determine whether the named entity is being used in a literal or a metonymic sense. Based on the output of the rules, the parser may apply a label selected from "metonymic," "unknown," and optionally "literal," to identify a preliminary named entity class for the particular named entity. Specifically, if at S110, a parser rule triggers a metonymic reading, at S112, the named entity is labeled to indicate that it is metonymy. If at S110, none of the parser rules triggered a metonymy reading, the named entity may be preliminarily classed as unknown and the method proceeds to step S114.

At S114, the distributional component compares the context in which the named entity is used in the text fragment with other contexts in which the named entity class is already known, and based on the comparison, assigns a class to the named entity. Specifically, the distributional component accesses a data structure 40 stored in memory 18 and, for each of a set of other contexts in which the named entity is found in the data structure, computes a distance between the context in which the named entity is being used and another context in which the named entity is used, some of which may be uses in a known metonymic sense.

At S116, based on the computed distances, a determination is made as to whether the present context is indicative of a metonymic use. For example, for each of a set of named entity classes, a score is computed based on the computed distances for that class. If the class with the highest score (closest based on the computed distances) is a metonymic class, the method proceeds to S112 and a metonymic label is applied. If the class is a literal class (or the class is unknown), a "literal" label may be applied (S118).

If at S122, the text fragment is identified as metonymic, at S120, a specific class may be assigned based on the parser metonymy rules triggered at S110 or class with the highest score at S116 may be assigned to the named entity. This step may include identifying whether the named entity is a location or organization, and based on the identification, further identifying one of a group of location specific or organization specific classes of metonymic use which is most applicable.

At S122, the document is output, together with its annotations. The method ends at S124.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for named entity resolution.

Further details of the exemplary system and method now follow.

Robust and Deep Parsing

In the exemplary system for named entity metonymy resolution, the parser 10 can be an incremental parser capable of performing robust and deep syntactic analysis. An exemplary parser is the Xerox Incremental Parser (XIP), described in as described, for example, in U.S. Pat. No. 7,058,567 to Ait-Moktar, incorporated herein by reference in its entirety, and in Aït-Mokhtar S., Chanod, J. P., Roux, C. "Robustness beyond Shallowness: Incremental Dependency Parsing," Special issue of NLE journal (2002); Aït-Mokhtar, et al. "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

Generally, the parser first assigns features to the identified text fragments, e.g., by applying finite state transducers. In particular, the parser includes a morphological module or "lemmatizer" which associates features from a list of features, such as indefinite article, noun, verb, and other parts of speech, with each recognized word or other text fragment in the document. This module may thus attach tags to a sentence which identify the grammatical parts of the sentence. Some words may have more than one label for example the word master may be a verb and a noun. Where more than one feature is applicable to a given word, techniques may be applied for resolving ambiguity and a most likely feature, for the given context, is output.

The deep syntactic analysis may include the construction of a set of syntactic relations (dependencies) from an input text by application of a set of parser rules (symbolic rules). Exemplary methods are developed from dependency grammars, as described, for example, in Mel'čcuk I., "Dependency Syntax," State University of New York, Albany (1988) and in Tesnière L., "Elements de Syntaxe Structurale" (1959) Klincksiek Eds. (Corrected edition, Paris 1969).

The syntactic relations output by the parser (both binary and more generally n-ary relations), link lexical units of the input text and/or more complex syntactic domains that are constructed during the processing (mainly chunks, as described, for example in Abney S., "Parsing by Chunks," in Principle-based Parsing (Robert Berwick, Steven Abney and Carol Teny, Eds., Kluwer Academics Publishers 1991). These syntactic relations are labeled, when possible, with deep syntactic functions. More precisely, a predicate (verbal or nominal) is linked with what may be referred to as its deep subject (SUBJ-N), its deep object (OBJ-N), and modifiers.

Moreover, together with surface syntactic relations handled by a general English grammar, the exemplary parser may calculate more sophisticated and complex relations using derivational morphology properties, deep syntactic properties (subject and object of infinitives in the context of control verbs), and some limited lexical semantic coding (e.g., Levin's verb class alternations, see Levin, B., "English Verb Classes and Alternations—A Preliminary Investigation," (1993), and some elements of the Framenet classification, as described, for example, in Ruppenhofer, J. Michael Ellsworth, Miriam R. L. Petruck, Christopher R Johnson and Jan Scheffczyk, "Framenet II: Extended Theory and Practice," ICSI Technical Report (2006). These deep syntactic relations correspond roughly to the agent-experiencer roles that are subsumed by the SUBJ-N relation and to the patient-theme role subsumed by the OBJ-N relation, as disclosed, for example, in Hagège C., Roux C., "Entre Syntaxe et Sémantique: Normalisation de l'analyse syntaxique en vue de l'amélioration de l'extraction d'information," Proceedings TALN 2003, Batz-sur-Mer, France (2003); and Brun, C., Hagège C., "Normalization and Paraphrasing Using Symbolic Methods," Proc. 2nd Intern'l Workshop on Paraphrasing, ACL 2003, Sapporo, Japan (2003). Not only verbs bear these relations but also deverbal nouns with their corresponding arguments.

An example of an output (chunk tree and deep syntactic relations) for the following sentence by a conventional parser (without metonymy rules) follows:

Mr Bouez said Lebanon still wanted to see the implementation of a UN resolution demanding Israel immediately take back nearly 400 Palestinians deported to southern Lebanon.

TOP{SC{NP{NOUN{Mr Bouez}} FV{said}} SC{NP{Lebanon} FV{still wanted}} IV{to see} NP{the implementation} PP{of NP{a UN resolution}} NP{AP{demanding} Israel} immediately FV{take} back nearly NP{400 Palestinians} FV{deported} PP{to NP{NOUN{southern Lebanon}}}.}
MOD_PRE(wanted,still)
MOD_PRE(Israel,demanding)
MOD_PRE(resolution,UN)
MOD_POST(deported,southern Lebanon)
MOD_POST(implementation,resolution)
SUBJ-N_PRE(said,Mr Bouez)
SUBJ-N_PRE(take,Israel)
SUBJ-N_PRE(deported,Palestinians)
SUBJ-N(demanding,Israel)
PERSON(Mr Bouez)
COUNTRY(Lebanon)
COUNTRY(Israel)
COUNTRY(Lebanon)
ORGANIZATION(UN)
MANNER_PRE(deported,nearly)
MANNER_PRE(take,immediately)
EXPERIENCER_PRE(wanted,Lebanon)
EXPERIENCER(see,Lebanon)
CONTENT(see,implementation)
EMBED_INFINIT(see,wanted)
OBJ-N(implement,resolution)

In the XIP output represented above, for each syntactic relation, the type of syntactic relation (such as SUBJ-N_PRE), is given first, with the pair of lexical units (or in some cases, a single lexical unit) in the relation being given in parenthesis. Some of the output dependencies are for named entities (e.g., PERSON(Mr Bouez) and COUNTRY(Lebanon)). As will be appreciated, the XIP parser, as discussed herein, is intended to be exemplary only. Different parsers with different levels and types of parsing rules can be used in place of the XIP parser.

Adaptation of the Parser to the Metonymy Resolution Task

A conventional parser, such as the XIP parser, includes a module for "standard" Named Entity recognition, which may be adapted in order to handle Named Entity metonymy. Rules may be developed for detection of named entity metonymy and added to the conventional parser rules. For example, a corpus study may be performed on a large set of trial data in order to detect lexical and syntactic regularities triggering a metonymy, for both location names and organization names. For example, the subject relation between organizations or locations and verbs can be examined and then the verbs classified accordingly. From such a study, hypotheses can be drawn, such as "if a location name is in a subject relation with a verb referring to an economic action (feature "v_econ"), such as import, provide, refund, repay, etc., then the metonymy place-for-people applies to the location name". The parser can then be adapted by adding dedicated lexicons that encode, in the format of "semantic features," the information collected from the corpus and new rules can be developed which are applied on top of the output of the parser that modifies the interpretation of the entity, taking into account the lexical information. For example, the hypothesis mentioned above permits the development of the following rule:
If (LOCATION(#1) & SUBJ-N(#2[v_econ],#1)) then PLACE-FOR-PEOPLE(#1)

which is read as: "if the parser has detected a location name (#1), which is the subject of a verb (#2) bearing the feature "v-econ", then create a PLACE-FOR-PEOPLE unary predicate on #1.

It is helpful to adapt the parser rules to focus on syntactico-semantic relations that are particularly significant for the metonymy resolution problem, like subject, object, experiencer, content, modifiers (nominal and prepositional) and attributes. The already-encoded lexical information attached to verbs by the parser may also be employed, such as, for example, communication verbs like say, deny, comment (from the Levin's classification), or categories belonging to the FrameNet Experiencer subject frame, e.g., verbs like feel, sense, see, nouns like despair, compassion, and adoration, or adjectives like sympathetic, sad, etc. This information can be particularly useful since experiencers denote persons or groups of persons, therefore all organizations or locations having an experiencer role in a sentence can be considered respectively as organization-for-members or location-for-people.

As an example, a set of dependency rules may be developed for the XIP parser for treatment of location metonymy and another set of dependency rules may be developed for the treatment of organization metonymy. Following are some examples of outputs, when applying the modified parser with the added dependency rules on exemplary sentences (only dependencies are shown):

1. It was the largest Fiat anyone had ever seen.
    ORG-FOR-PRODUCT(Fiat)
    MOD_PRE(seen,ever)
    SUBJ-N_PRE(was,It)
    ATTRIB(It,Fiat)
    EXPERIENCER_PRE(seen,anyone)
    SUBJATTR(It, Fiat)
    QUALIF(Fiat,largest)

In this example, the conventional parser rules identify "Fiat" as a named entity and create the syntactic relation ORGANIZATION(Fiat). Thereafter, the parser's metonymic dependency rules for Organization Named Entities identify "Fiat" as a metonymic use and the dependency "organization-for-product" as being applicable. In this example, it is the syntactic relation QUALIF(Fiat, largest), which identifies that the lexical unit "largest" qualifies the lexical unit "Fiat", that triggers the metonymical interpretation of "Fiat" as organization-for-product.

2. The availability of Great Britain players has boosted the medal hopes of Glasgow Western.
    PLACE-FOR-PEOPLE(Great Britain)
    PREP_OF(availability,players)
    PREP_OF(hopes,Western)
    MOD_PRE(players,Great Britain)
    MOD_PRE(hopes,medal)
    MOD_PRE(Western,Glasgow)
    SUBJ-N_PRE(boosted,availability)
    OBJ-N(boosted,hopes)
    LOCATION(Glasgow)

In this example, the conventional parser rules identify "Great Britain" as a Location type of Named Entity and may assign the syntactic relation COUNTRY(Great Britain). This triggers the Location Named Entity rules. In this example, the relation MOD_PRE (players, Great Britain) triggers the metonymical interpretation of "Great Britain" as place-for-people, because "players" refers to a sport team designated by the name of the country. MOD_PRE refers to a modifier relation where the modifier is placed before the modified lexical unit.

The deep syntactic parsing with metonymic interpretation performed at S104-S110 is the backbone of the exemplary system. The parsing output is used as input of the distributional component 12, which aims at widening the coverage of the system 1 by calculating words' similarity using syntactic context. In particular, the distributional component 12 may be employed where there is no specific dependency rule in the parser which is able to identify a metonymic use of an identified named entity.

Hybridization with Distributional Analysis

The distributional approach employed in step S114-S116 establishes a distance between words, depending on their syntactic distribution. The distributional approach is based on the hypothesis is that words that appear in similar contexts are semantically similar. In other words, the more two words have the same distribution, i.e., are found in the same syntactic contexts, the more they are considered to be semantically close.

The exemplary embodiment applies this principle for metonymy resolution. Classically, the distributional approach is able to group words as USA, Britain, France, Germany because there are in the same syntactical contexts as:

(1) Someone live in Germany.
(2) Someone works in Germany.
(3) Germany declares something.
(4) Germany signs something.

As previously noted, the metonymy resolution task aims to distinguish the literal cases, (1) & (2), from the metonymic cases, (3) & (4). The exemplary method establishes these distinctions using the syntactic context distribution (instead of using words distribution). In other words, contexts which occur with the same words are grouped together. In the above examples, the syntactic contexts live in and work in occur with Germany, France, country, city, place. The syntactic contexts subject-of-declare and subject-of-sign occur with Germany, France, someone, government, president.

A distributional space is constructed with training data, e.g., an untagged corpus, such as the 100 million word British National Corpus (100M BNC) (see http://www.natcorp.ox.ac.uk). This is a corpus of modern British English for use in linguistic research. The training corpus is prepared for use by lemmatizing and then parsing to identify syntactic relations. In particular, the parser includes instructions for syntactically, semantically, and lexically analyzing the untagged corpus and identifying relationships between lexical units. Parsing can be performed with the same robust parser used for steps S104-S108 of the extraction method.

Relations involving a named entity of type location or organization are extracted from the corpus, along with their frequencies. For example the relation PREP_OF(invasion, COUNTRY) appears 469 times in the BNC, the relation SUBJ(COMPANY, decides) appears 420 times, etc. The most frequent relations may be filtered (either manually or by application of parser rules) in order to decide if such a context is triggering a metonymy or not, and to which class it belongs. Once the words of the context are classified, they can be integrated into semantic lexicons.

Figure 3:
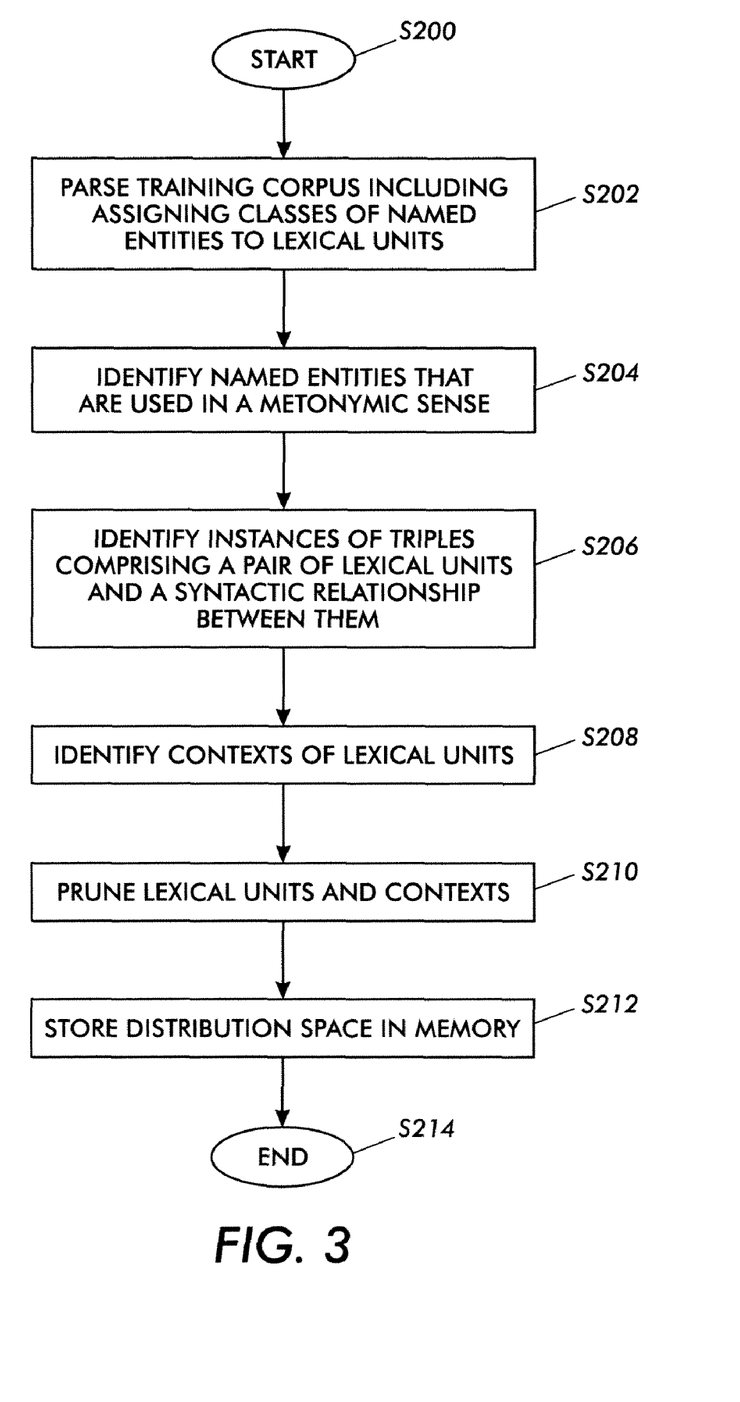
FIG. 3 is a flowchart which illustrates a method for generating a distribution space.

FIG. 3 illustrates an exemplary method for developing the distributional space. The method begins at S200. At S202, the corpus is parsed.

At S204, metonymic classes are assigned to those lexical units corresponding to named entities used in a metonymic sense. This may be performed by applying the parser metonymy rules in an unsupervised manner, or with some manual input (e.g., an operator checks that the assigned class is correct).

At S206, instances of triples in the parsed corpus are identified. Each triple has the form $w_1.R.w_2$, where $w_1$ and $w_2$ are lexical units and R is a syntactic relation. Each lexical unit can be a word or a group of two or more words which the parser has grouped together. In particular, lexical units can be nominal groups or verbal groups. A nominal group includes a noun as its head and may further include premodifiers and post modifiers, such as adjectives. A verbal group includes a verb as its head and may further include one or more auxiliaries. For example, one of $w_1$ and $w_2$ in each triple may be a nominal group and the other of $w_1$ and $w_2$ may be a verbal group.

At S208, syntactic contexts of lexical units are identified. Each triple implies two syntactic contexts. Each syntactic context is expressed by the relation R, one of the lexical units implied in this relation, and the position of this lexical unit (governor or dependent of the relation). In the triple $w_i.R.w_j$, the contexts $1.R.w_i$ and $2.R.w_j$ can therefore be identified. "1" means that $w_i$ is the governor of the relation R and "2" mean that $w_j$ is the dependent of the relation R. A syntactic context can be a simple context or a composed context, where a composed context comprises two (or more) simple contexts.

The triple occurrences may be used to build a data structure representing the distributional space. In this space, each point $x_i$ is a syntactical context (with the form 1.R.w or 2.R.w), each dimension j is a lexical unit, and each value $x_i(j)$ is the frequency of corresponding triple occurrences.

By way of example, consider the sentence: Provide Albania with food aid. The parser gives the following triples where for example, food aid is considered as a lexical unit:
OBJ-N('VERB:provide','NOUN: Albania').
PREP_WITH('VERB: provide','NOUN:aid').
PREP_WITH('VERB: provide','NP:food aid').

In each of these triples, the syntactic relation R, identified between the two lexical units $w_1$ and $w_2$, is placed first, with the two lexical units in parenthesis, although other representations could of course be used. In the XIP parser language, the syntactic relation OBJ-N in the first triple implies that "Albania" is the object of the verb provide. The syntactic relation PREP-WITH implies that the preposition "with" links the lexical units "provide" and "aid" in the second triple and the lexical units "provide" and "food aid" in the third triple.

From these three triples, the following lexical units and contexts can be created:

| Lexical units (words) | contexts |
|---|---|
| VERB: provide | 1.VERB: provide. OBJ-N |
| NOUN: Albania | 1.VERB: provide.PREP_WITH |
| NOUN: aid | 2.NOUN: Albania.OBJ-N |
| NP: food aid | 2.NOUN: aid. PREP_WITH |
| | 2.NP: food aid. PREP_WITH |
| | 1.VERB: provide.OBJ-N+2.NOUN: aid. PREP_WITH |
| | 1.VERB: provide.OBJ-N+2.NP: food aid. PREP_WITH |
| | 1.VERB: provide.PREP_WITH+2.NO: Albania.OBJ-N |

For example, in the context 1.VERB: provide. OBJ-N, "1" means that the verb provide is the governor of the relation OBJ-N):

Thus, for example if "Albania" is the lexical unit j, assuming that it occurs in a subject type of relationship R in 100 triples in the corpus, it may be assigned a frequency $x_i(j)$ of 100. The frequency may be a normalized frequency. Thus, if "Albania" occurs a total of 1000 times in the corpus, its (normalized) frequency $x_i(j)$ is 0.1. Normalization of the frequencies of occurrence may occur in a subsequent step, as described in greater detail below.

At S210, lexical units and/or syntactic contexts may be pruned to retain the most frequently occurring. In particular, a heuristic may be used to control the high productivity of the lexical units and contexts. For example, each lexical unit and each context has to appear more than 100 times in the corpus be considered for inclusion in the distributional space. As an example, from the 100M BNC, 60,849 lexical units and 140,634 contexts which each exceeded the threshold of 100 occurrences were obtained. The resulting distributional space formed from the triples which include these lexical units and contexts then has 140,634 points $x_i$ and 60,849 dimensions j.

At S212, the distributional space thus generated (or simply the retained triples which exceed the threshold number of occurrences for being considered significant) may be stored in memory 18.

Using such a global distribution space to compute distances between each context for such a sizeable corpus may be computationally expensive and may induce artificial ambiguity. If any Named Entity can be used in a metonymic reading, in a given corpus each Named Entity has not the same distribution of metonymic readings. For example, the country Vietnam is more frequently used as an event than France or Germany because Vietnam is frequently used to refer to the war that happened there, which is not the case for France and Germany. So, knowing that a context is employed with Vietnam allows the metonymic ambiguity to be reduced. In the exemplary method, a singular sub-space is constructed, depending of the context and of the lexical unit (the ambiguous Named Entity).

Figure 4:
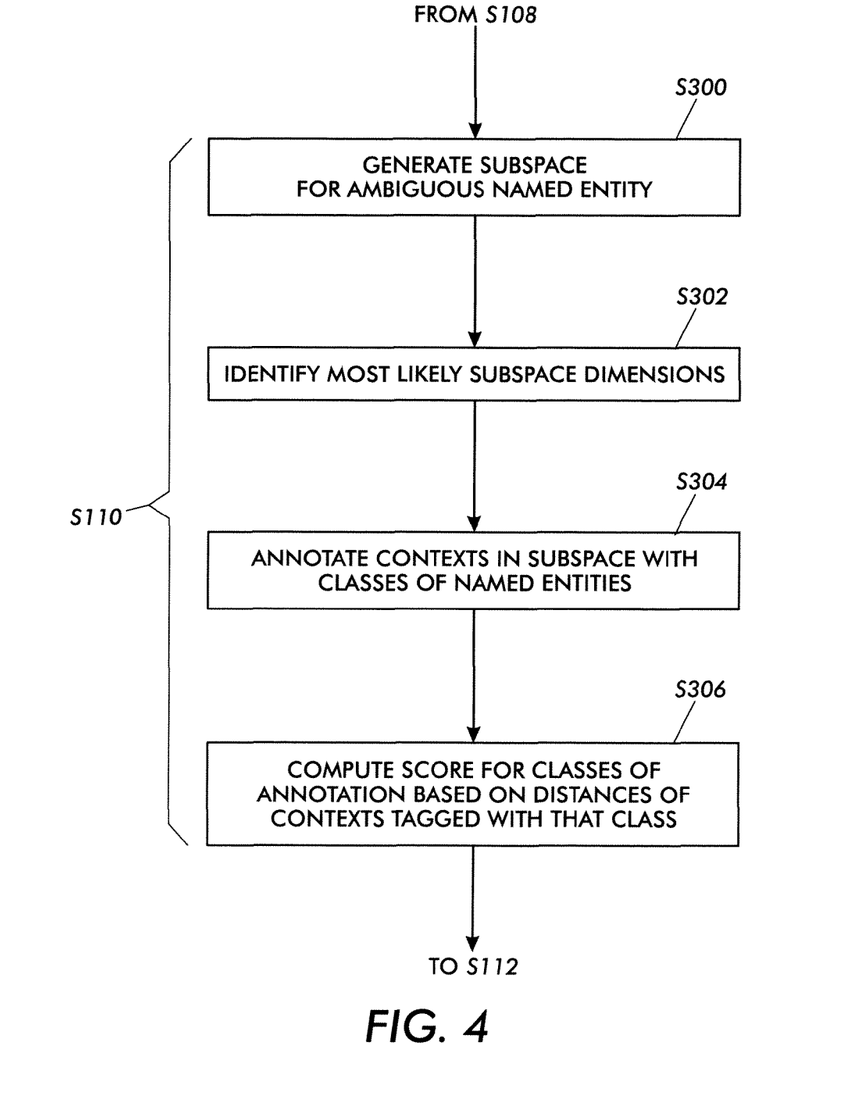
FIG. 4 illustrates substeps of the exemplary method of FIG. 2.

Returning now to the method for metonymy resolution with the thus formed data structure, FIG. 4 illustrates substeps of step S110 of the exemplary metonymy resolution method.

At S300, a singular sub-space may be constructed from the data structure, depending on the context and the lexical unit (the ambiguous Named Entity): For a given couple (context $x_i$+lexical unit j), a subspace can be constructed as follows:

Let Sub_contexts=list of contexts $x_i$ which are occurring with the lexical unit j in the global distribution space.

If there are more than k contexts $x_i$, only the k most frequently occurring contexts are retained.

Let Sub_dimension=list of lexical units which are occurring with at least one of the contexts $x_i$ from the Sub_contexts list. If there are more than n words, retain only the n most frequent words (as determined by their relative frequencies) in the Sub_contexts list. For example, n=1,000.

The sub-space thus includes a subset of the contexts within the global distribution space.

For example, in the case of the phrase provide Albania with food aid, the lexical unit j to be resolved may be identified as Albania and one of its contexts $x_i$ as object-of-provide. In the global distribution space, the lexical unit Albania may occur in triples with several contexts, such as object-of-allow (in sentences such as "allow Albania . . . "), subject-of-benefit (in sentences such as "Albania would benefit . . . "), etc. The k most frequently occurring of these contexts form the Sub_contexts. Each of the k Sub_contexts may occur with a substantial number lexical units, such as France (in sentences such as "allow France . . . "), patient (in sentences such as "allow my patient . . . "), undergraduate (in sentences as "undergraduates in English would benefit . . . "), Government (in sentences as "Government would benefit . . . "), and so forth, of which the n most frequently occurring contexts form the Sub_dimensions.

At S302, dimensions of this sub-space may be reduced to 10 dimensions, e.g., with Principal Component Analysis (PCA). In this step, the normalized frequencies of occurrence may be determined.

At S304, the results of the symbolic approach are used to annotate the contexts in the new reduced space (k*10) generated at S302. In particular, to each context of the Sub_contexts list, the annotation attributed by the symbolic metonymy rules, if there is one, is assigned.

At S306, each entity name class of annotation (literal, place-for-people, place-for-event, etc) is attributed a score corresponding to the sum of the scores obtained by each context $x_{i'}$ annotated with this class. The score of a context $x_{i'}$ decreases in inverse proportion to its distance from the context $x_i$. Specifically, score(context $x_{i'}$)=1/d(context $x_i$, context $x_{i'}$) where $d(x_i, x_{i'})$ is the Euclidian distance between $x_i$ and $x_{i'}$. i.e., $$d(x_i, x_{i'}) = \sqrt{\sum_{j=1}^{n} (x_i(j) - x_{i'}(j))^2}$$

Where n is the number of words in the sub-space

As noted above, the values of $x_i(j)$ and $x_{i'}(j)$ are the frequencies (optionally normalized) of occurrence of the triple in the distribution space.

These steps may be repeated for each text string in the document.

The method then continues to step S112 (FIG. 2), where Named Entities are annotated with the annotation class having the highest computed score. This process can be illustrated with the sentence: Provide Albania with food aid. The lexical unit Albania is found in 384 different contexts (|Sub_contexts|=384) in the training corpus and 54,183 lexical units are occurring with at least one of the contexts from the Sub_contexts list (|Sub_dimension|=54,183).

After reducing the dimensions with PCA, the context list below is obtained, ordered by closeness with the given context (1.VERB:provide.OBJ-N):

| Contexts | d | symbolic annotation |
|---|---|---|
| 1.VERB: provide.OBJ-N | 0.00 | |
| 1.VERB: allow.OBJ-N | 0.76 | PLACE-FOR-PEOPLE |
| 1.VERB: include.OBJ-N | 0.96 | |
| 2.ADJ: new.MOD_PRE | 1.02 | |
| 1.VERB: be.SUBJ-N | 1.43 | |
| 1.VERB: supply.SUBJ-N_PRE | 1.47 | LOC-LITERAL |
| 1.VERB: become.SUBJ-N_PRE | 1.64 | |
| 1.VERB: come.SUBJ-N_PRE | 1.69 | |
| 1.VERB: support.SUBJ-N_PRE | 1.70 | PLACE-FOR-PEOPLE |
| Etc. | | |
| Score for each metonymic annotation | | |
| PLACE-FOR-PEOPLE | 3.11 | |
| LOC-LITERAL | 1.23 | |
| PLACE-FOR-EVENT | 0.00 | |
| (others) | 0.00 | |

The score obtained by each annotation type allows annotating this occurrence of Albania as a place-for-people reading.

Without intending to limit the scope of the exemplary embodiment, the following examples demonstrate applications of the exemplary system and method.

EXAMPLE 1

Symbolic Method Alone

As an example of the effectiveness of the parser without the distributional component, a set of approximately 70 dependency rules were developed for the XIP parser for treatment of location metonymy and another set of approximately 100 dependency rules were developed for the treatment of organization metonymy. Semantic information was attached to a vocabulary of about of 900 words.

The parser rules were applied to a training corpus comprising a set of documents. The following measures were determined:

Accuracy=number of correct predictions/number of predictions;

Coverage=number of predictions/number of samples;

If c is a category (literal, place-for-people, etc):

Precision(c)=number of correct assignments(c)/number of assignment(c)

Recall(c)=number of correct assignments(c)/dataset instance of(c)

fscore(c)=2*precision(c)*recall(c)/precision(c)+recall(c)

Results
1. For Locations:
Global results (the baseline is calculated with literal by default) were as follows: Number of samples: 925; Accuracy: 0.92; Coverage: 1; Baseline accuracy: 0.79; Baseline coverage: 1. Results per class are given in TABLE 1:

TABLE 1

| Class | Number of occurrences | Precision | Recall | F-score |
|---|---|---|---|---|
| Literal | 737 | 0.915 | 0.993 | 0.952 |
| Place-for-people | 161 | 0.958 | 0.720 | 0.822 |
| Place-for-event | 0 | | | |
| Place-for-product | 0 | | | |
| Object-for-name | 0 | | | |
| Object-for-representation | 0 | | | |
| Othermet | 9 | 1 | 0.11 | 0.2 |
| Mixed | 15 | 1 | 0.06 | 0.125 |

The results given in TABLE 1 signify that for example, for the category "place-for-people," when the system annotates 100 samples with this category, it is correct for 95.8 samples. It signifies also that the system is able to annotate correctly 72 samples of this category while 100 are expected to be annotated.

2. For Organization Names:

Global results (the baseline is calculated with literal by default) were as follows: Number of samples: 1090; Accuracy: 0.83; Coverage: 1; Baseline accuracy: 0.63; Baseline coverage: 1. Results per class are given in TABLE 2:

TABLE 2

| Class | Number of occurrences | Precision | Recall | F-score |
|---|---|---|---|---|
| Literal | 690 | 0.825 | 0.970 | 0.891 |
| Organization-for-members | 220 | 0.856 | 0.760 | 0.804 |
| Organization-for-event | 2 | 0 | 0 | 0 |
| Organization-for-product | 74 | 0.836 | 0.756 | 0.794 |
| Organization-for-facility | 15 | 1 | 0.2 | 0.333 |
| Organization-for-index | 7 | 0.714 | 0.714 | 0.714 |
| Object-for-name | 8 | 0.857 | 0.75 | 0.8 |
| Othermet | 14 | 0 | 0 | 0 |
| Mixed | 59 | 0 | 0 | 0 |

EXAMPLE 2

Combined Symbolic and Distributional Method

A training corpus was processed with a modified XIP parser, as described for Example 1, and a distributional component. The training corpus comprised two corpora comprising, respectively, 908 location names and 842 organization names, to be annotated according to their metonymic or literal readings. For the distributional component, a distributional space was constructed with an untagged corpus (the 100M BNC) by lemmatizing and parsing the corpus.

The final results obtained by combining the symbolic approach and the distributional approach are presented below. The method used symbolic annotation, if a metonymic reading was identified, otherwise using distributional annotation. First the symbolic parsing component was run on the test data, leaving the information as "unknown" when no decision can be taken. Then the distributional component was run, again leaving the information as "unknown" when no decision could be taken. The obtained results were merged, as follows:

1. Select the metonymic interpretation provided by the symbolic component;
2. Then, on unknown remaining cases, select the information provided by the distributional component;
3. Replace all remaining unknown cases with the default interpretation, i.e. "literal"

The results were measured according to different levels of granularity:

1. Coarse: distinction between literal and non-literal readings, for example:

| "IBM announced that . . . " | non-literal |
| "He loved his trip in France." | literal |
| "These problems derived from associations with British India, where graveyards abounded . . . ". | non-literal |

2. Medium: distinction between literal, metonymic and mixed readings, for example:

| "IBM announced that . . . " | metonymic |
| "He loved his trip in France." | literal |
| "These problems derived from associations with British India, where graveyards abounded . . . " | mixed |

3. Fine: distinction between all types of metonymy, for example:

| "IBM announced that . . . " | org-for-members |
| "He was haunted by Vietnam" | place-for-event |
| "He loved his trip in France." | literal |
| "These problems derived from associations with British India, where graveyards abounded . . . " | mixed |

TABLE 3 shows the global results obtained with the exemplary system, for the 3 levels of granularity and for location and organization names:

TABLE 3

| Granularity | Accuracy | Coverage | Baseline accuracy | Baseline coverage |
|---|---|---|---|---|
| Location (coarse) | 0.851 | 1 | 0.794 | 1 |
| Location (medium) | 0.848 | 1 | 0.794 | 1 |
| Location (fine) | 0.841 | 1 | 0.794 | 1 |
| Organization (coarse) | 0.731 | 1 | 0.617 | 1 |
| Organization (medium) | 0.711 | 1 | 0.617 | 1 |
| Organization (fine) | 0.699 | 1 | 0.617 | 1 |

Global Results of the System

The results shown in TABLE 3 are above the baseline for both types of named entities, and show that the exemplary hybrid method disclosed herein is useful for the purpose of metonymy resolution on named entities. Here, the baseline is the default result obtained by systematically considering all named entity occurrences as literal.

The exemplary apparatus and method for metonymy resolution find application in information extraction in general, question answering, machine translation, and anaphora resolution. One particular use is for risk detection applications, in the framework of the Infom@gic project, for which a system that detects events together with their coordinates (actor, source, location, date) is developed. In a sentence like "Russia and Iran initially signed a contract on 8 Jan. 1995 for the first reactor at Bushehr", is it important to know that Iran and Russia designate the government of the countries (place-forpeople, in our typology of metonymies), in order to identify them as actors of the event and not location of the event.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for named entity resolution comprising:
   providing a stored global distribution space comprising triples, each triple having the form $w_1.R.w_2$, where $w_1$ and $w_2$ are lexical units, and R is a syntactic relation between the lexical units $w_1$ and $w_2$, at least some of the lexical units being named entities;
   with a computing device, parsing an input text string to identify a context in which an identified named entity of the input text string is used, the context including a lexical unit which is in an identified syntactic relation with the identified named entity;
   comparing the identified context with a plurality of stored contexts, each stored context comprising a respective lexical unit which is in an identified syntactic relation with another named entity and in which the other named entity in the stored context is associated with a class of named entity, the named entity class being selected from a plurality of classes, at least one of the plurality of classes corresponding to a metonymic use of a respective other named entity, the comparing comprising:
      from the stored global distribution space, identifying a sub-space comprising a subset of the triples, each of the triples in the subset comprising a stored context $w_1.R$ or $R.w_2$ and a lexical unit $w_2$ or $w_1$, respectively, in which the stored context $w_1.R$ or $R.w_2$ is one that is also found in a triple with the identified named entity in the global distribution space and the lexical unit for at least some of the triples in the subspace comprises another named entity;
      for each of the plurality of stored contexts, computing a distance between the identified context and the stored context, the distance being computed as a function of a difference between a frequency of occurrence, in a distribution space derived from a training corpus, of the identified named entity in the identified context and a frequency of occurrence, in the distribution space, of the other named entity in the stored context;
      computing a score for each of the plurality of named entity classes based on the computed distances; and
   assigning a named entity class from the plurality of named entity classes to the identified named entity based on at least one of the identified context and the scores.

2. A method for named entity resolution comprising:
   with a computing device, parsing an input text string to identify a context in which an identified named entity of the input text string is used;
   comparing the identified context with a plurality of stored contexts in which the named entity in the stored context is associated with a class of named entity, the named entity class being selected from a plurality of classes, at least one of the plurality of classes corresponding to a metonymic use of a respective named entity; and
   assigning a named entity class from the plurality of named entity classes to the identified named entity based on at least one of the identified context and the comparison, wherein the comparing comprises:
      from a stored global distribution space comprising triples, each triple comprising a lexical unit and a context in which the lexical unit is found in a training corpus, each triple having the form $w_1.R.w_2$, where $w_1$ and $w_2$ are lexical units, and R is a syntactic relation between the lexical units $w_1$ and $w_2$, at least some of the lexical units being named entities, identifying a sub-space comprising a subset of the triples, each of the triples in the subset comprising a stored context $w_1.R$ or $R.w_2$ and a lexical unit $w_2$ or $w_1$, respectively, the stored context $w_1.R$ or $R.w_2$ being one that is also found in a triple with the identified named entity in the global distribution space;
      for triples in the sub-space, determining whether the named entity in the stored context is associated with a class of named entity selected from the plurality of classes, and if so, assigning the class to the named entity;
      for each of the plurality of stored contexts, computing a distance between the identified context and the stored context, the computing of the distance being computed for stored contexts in the sub-space;
      computing a score for each of the plurality of named entity classes based on the computed distances; and
      assigning one of the named entity classes to the identified named entity, based on the computed scores.

3. The method of claim 1, wherein the parsing includes applying a set of dependency rules to the input text string, each of the dependency rules specifying a syntactic relation between a first lexical unit based on a named entity and a second lexical unit, the rule being satisfied when the relation is present in the input text string.

4. The method of claim 3, wherein the context is based on the syntactic relation and the named entity.

5. The method of claim 1, wherein the class is selected from a set of classes including a literal class and at least one metonymic class.

6. The method of claim 5, wherein the at least one metonymic class comprises at least one location-specific metonymic class and at least one organization-specific metonymic class.

7. The method of claim 6, wherein the at least one organization-specific metonymic class comprises at least two organization-specific classes selected from the group consisting of:
   a class in which an organization name stands for its members;
   a class in which the organization name refers to an event associated with the organization;
   a class in which the organization name refers to its products;
   a class in which the organization name stands for the facility that houses the organization;
   a class in which the organization name is used as an index indicating its value;
   a class in which the name is used as a string; and
   a class in which the organization name refers to a representation;
   the organization-specific classes optionally further including an additional class for all other types of organization-specific metonymy not otherwise covered.

8. The method of claim 6, wherein the at least one location-specific metonymic class comprises at least two location-specific classes selected from the group consisting of:
   a class in which a location name stands for persons or an organization associated with it;

a class in which the location name stands for an event that happened there;

a class in which the location name stands for a product developed there;

a class in which the location name is used as a reference to another name;

a class in which the location name refers to a representation;

the location-specific classes optionally further including an additional class for all other types of location-specific metonymy not otherwise covered.

9. The method of claim 1, wherein the parsing includes assigning a preliminary class to the named entity selected from a set of preliminary classes including a literal class, at least one metonymic class, and an unknown class.

10. The method of claim 9, wherein when the preliminary class assigned is an unknown class, the assigning of the named entity class from the plurality of named entity classes is based on the comparison.

11. The method of claim 1, further comprising annotating a document in which the text string occurs in accordance with the assigned class.

12. A computer program product comprising a non-transitory recording medium encoding instructions which, when executed on a computer, perform the method of claim 1.

13. A hybrid system for named entity resolution comprising:

memory which stores:
   a symbolic component for identifying a context in which an identified named entity of an input text string is used;
   a data structure which stores a subset of triples identified from a global distribution space comprising triples, each triple in the global distribution space having the form $w_1.R.w_2$ where $w_1$ and $w_2$ are lexical units, and R is a syntactic relation between the lexical units $w_1$ and $w_2$, at least some of the lexical units being named entities, each of the triples in the subset comprising a stored context $w_1.R$ or $R.w_2$ and a respective lexical unit $w_2$ or $w_1$, in which the stored context $w_1.R$ or $R.w_2$ is one that is also found in a triple with the identified named entity in the global distribution space and the lexical unit for at least some of the triples in the subset of triples comprises another named entity;
   a distribution component for computing a distance between the identified context in which the named entity is being used and another context in which the named entity is used in a known metonymic sense, the distance being computed as a function of a difference between a frequency of occurrence, in the distribution space, of the identified named entity in the identified context and a frequency of occurrence, in the distribution space, of another named entity in the stored context; and
a processor which implements the symbolic component and distribution component;
the system assigning a class to the identified named entity, based on at least one of the identified context and the computed distance.

14. The system of claim 13, wherein the symbolic component comprises a parser which applies a set of dependency rules to the input text string, each of the dependency rules specifying a syntactic relation between a first lexical unit based on a named entity and a second lexical unit, the rule being satisfied when the relation is present in the input text string.

15. The system of claim 14, wherein the context is based on the relation and the named entity.

16. The system of claim 13, wherein the class is selected from a set of classes including a literal class and at least one metonymic class.

17. The system of claim 16, wherein the at least one metonymic class comprises at least one location-specific metonymic class and at least one organization-specific metonymic class.

18. The system of claim 13, wherein the symbolic component assigns a class to the named entity selected from a set of classes including a literal class, at least one metonymic class, and an unknown class.

19. The system of claim 18, wherein when the class assigned by the symbolic component is an unknown class, the class assigned by the system to the identified named entity is based on the computed distance.

20. The system of claim 13, wherein the distribution component assigns a score to the named entity based on the computes the distance between the context in which the named entity is being used and another context in which the named entity is used in a known metonymic sense.

21. A method for document annotation comprising:
providing a stored global distribution space comprising triples, each triple having the form $w_1.R.w_2$, where $w_1$ and $w_2$ are lexical units, and R is a syntactic relation between the lexical units $w_1$ and $w_2$, at least some of the lexical units being named entities;
inputting, to a computer system, a document comprising at least one text string;
with a processor of the computer system:
   parsing the text string to identify a context in which an identified named entity of the text string is used;
   comparing the identified context with at least one stored context in which the named entity in the stored context is associated with a class of named entity, the named entity class being selected from a plurality of classes, at least one of the plurality of classes corresponding to a metonymic use of a respective named entity, the comparing comprising:
      from the stored global distribution space, identifying a sub-space comprising a subset of the triples, each of the triples in the subset comprising a stored context $w_1.R$ or $R.w_2$ and a lexical unit $w_2$ or $w_1$, respectively, in which the stored context $w_1.R$ or $R.w_2$ is one that is also found in a triple with the identified named entity in the global distribution space and the lexical unit for at least some of the triples in the subspace comprises another named entity;
   for each of the plurality of stored contexts, computing a distance between the identified context and the stored context, the computing of the distance being computed for stored contexts in the sub-space; and
   assigning a named entity class from the plurality of named entity classes to the identified named entity based on at least one of the identified context and the computed distances; and
annotating the document based on the assigned class.

* * * * *